United States Patent [19]

Lama

[11] 4,373,780
[45] Feb. 15, 1983

[54] IMAGE TRANSMITTING SYSTEM UTILIZING A GRADIENT INDEX LENS

[75] Inventor: William L. Lama, Webster, N.Y.

[73] Assignee: Xerox Corporation, Stamford, Conn.

[21] Appl. No.: 159,993

[22] Filed: Jun. 16, 1980

[51] Int. Cl.³ .............................................. G02B 5/17
[52] U.S. Cl. ............................... 350/96.25; 350/96.31; 355/1
[58] Field of Search ............... 350/96.18, 96.24, 96.25, 350/96.27, 96.31, 413; 355/1

[56] References Cited

U.S. PATENT DOCUMENTS

| 3,658,407 | 4/1972 | Kitano et al. | 350/96.25 |
| 3,922,062 | 11/1975 | Uchida | 350/96.12 |
| 3,947,106 | 3/1976 | Hamaguchi et al. | 355/1 |
| 3,977,777 | 8/1976 | Tanaka et al. | 355/1 |
| 4,258,978 | 3/1981 | Cole | 350/96.25 |
| 4,264,130 | 4/1981 | Ogura | 350/96.25 |
| 4,331,380 | 5/1982 | Rees et al. | 350/96.25 |

FOREIGN PATENT DOCUMENTS

| 54-141138 | 2/1979 | Japan | 350/96.25 |
| 1270343 | 4/1972 | United Kingdom . | |
| 1489420 | 10/1977 | United Kingdom . | |
| 2023302 | 12/1979 | United Kingdom | 350/96.25 |

OTHER PUBLICATIONS

Rees et al., "Some Radiometric Properties of Gradient-Index Fiber Lenses," *Appl. Optics*, vol. 19, No. 7, Apr. 1980, pp. 1065-1069.
Kawazu et al., "Application of Gradient-Index Fiber Arrays to Copying Machines," *Appl. Optics*, vol. 19, No. 7, Apr. 1980, pp. 1105-1112.

Primary Examiner—John D. Lee

[57] ABSTRACT

A gradient index lens array is formed by assembling a plurality of gradient index fibers into a single row. The fiber parameters and fiber-to-fiber spacing are optimized to provide required illumination level while minimizing illumination spatial modulation.

2 Claims, 8 Drawing Figures

IMAGE TRANSMITTING SYSTEM UTILIZING A GRADIENT INDEX LENS

BACKGROUND AND PRIOR ART STATEMENT

The present invention relates to gradient index optical fibers and more particularly, to an array of fibers forming an imaging lens array which transmits an image of an object plane to an image plane. In a preferred embodiment, the fiber and array parameters are optimized so that the same or better radiometric efficiency and uniformity are obtained while using fewer fibers than required in the prior art, thereby permitting construction of a lens array comprising a single row of gradient index fibers.

Image transmitters comprising bundled gradient index optical fibers are known in the art. U.S. Pat. No. 3,658,407 describes a light conducting fiber made of glass or synthetic resin which has a refractive index distribution in a cross section thereof that varies consecutively and parabolically outward from a center portion thereof. Each fiber acts as a focusing lens to transmit part of an image of an object placed at, or near, one end. An assembly of fibers, in a staggered two-row array, transmits and focuses a more complete image of the object. The fiber lenses are produced under the trade name "SELFOC"; the mark is registered in Japan and owned by Nippon Sheet Glass Co., Ltd.

These gradient index lens arrays have found use in a number of technologies; e.g. in construction of printed type electrical circuits as disclosed in U.S. Pat. No. 3,922,062 and as a replacement for conventional optical systems in copiers as disclosed in U.S. Pat. Nos. 3,947,106 and 3,977,777.

Because of the apparent optical characteristics of the gradient index fibers, it has heretofore been accepted that, to transmit images with acceptable image quality, a two row staggered array of fibers was required. The problems encountered with a one row configuration, were twofold: firstly, maintaining the two-row radiometric efficiency so that the particular image is transmitted at the required level of illumination and secondly, reducing the spatial modulation of the illumination to acceptable levels.

SUMMARY

It is therefore, the principal object of this invention to provide an improved gradient index lens array comprising a single row of optical fibers, the parameters of the lens array optimized to maintain desired illumination levels while minimizing modulation effects.

DRAWINGS

DESCRIPTION

Figure 1:
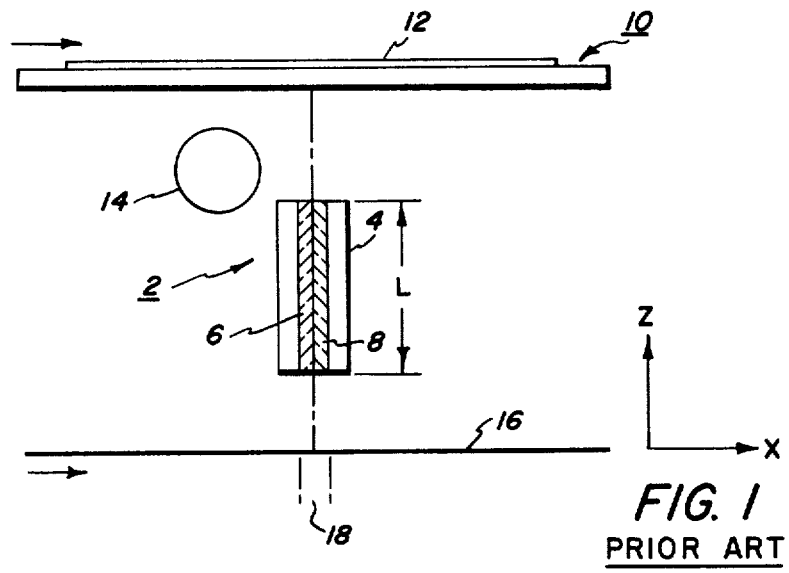
FIG. 1 is a schematic end view of a prior art gradient index lens array in an imaging system.

Referring now to FIG. 1, there is shown, in schematic side view, a prior art optical imaging system 2 which includes a gradient index lens array 4 comprising two staggered rows 6,8 of gradient index fibers arranged in a bundled configuration as is known in the prior art. Transparent object plane 10 is adapted for movement past lens 4 in the indicated direction. Plane 10 has an object 12, which may be a document, supported thereon. Lamp 14 provides a band of illumination across the width of the object plane 10.

Figure 2:
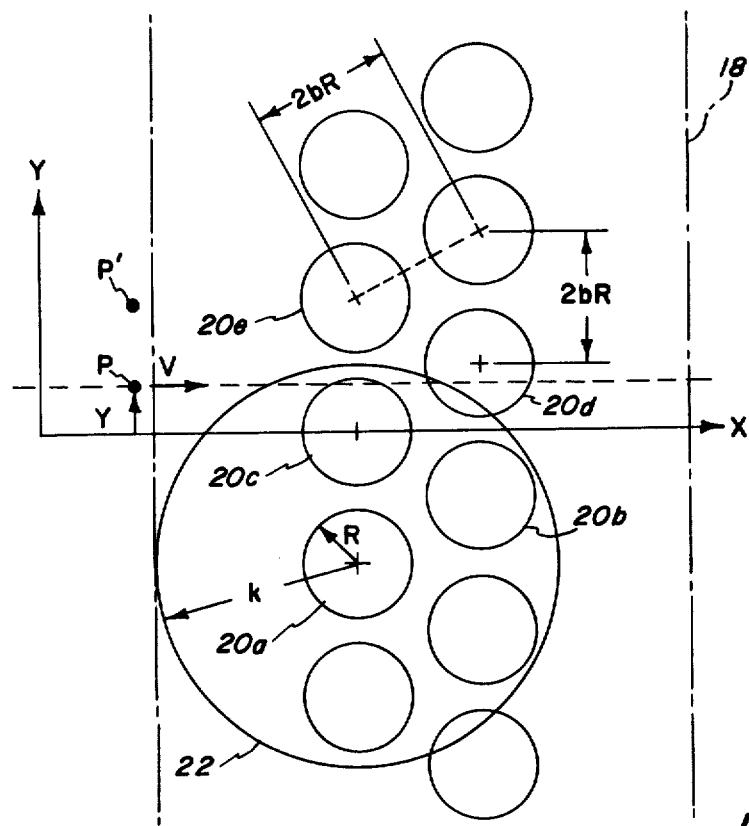
FIG. 2 is a schematic top view (enlarged) of a portion of the lens array of FIG. 1, also showing exposure conditions at the imaging plane.

In operation, plane 10 is moved across the illuminated area at a speed synchronous with that of a photosensitive imaging plane 16. A strip of light is reflected from object 12 and focused by lens 4 onto exposure strip 18 of plane 16. FIG. 2 is a top view, (enlarged), of a portion of lens 4 looking downward through the lens and viewing the corresponding portion of strip 18, in the image plane 16. Each fiber 20 produces an irradiance (optical power per unit area, H) distribution 22 in the image plane which is derived according to the principles disclosed in an article by James D. Rees and William L. Lama, entitled "Some Radiometric Properties of Gradient-Index Fiber Lenses", published in the 1 Apr. 1980 issue of Applied Optics, Vol. 19, No. 7, pp. 1065–1069, whose contents are herein incorporated by reference. A point P, specified by coordinates (X, Y), on image plane 16 moves at a speed v through exposure zone 18. The total exposure (E) of point P is defined as the integrated light energy per unit area (integral of H) that point P receives as it passes through zone 18. This total exposure is a summation of the exposure values of each contributing fiber.

The total exposure received by point P is derived by using the summing equations disclosed in the Rees-Lama reference. Of importance for the purposes herein is that the total exposure received by any point on the image plane passing through zone 18 is a function of its Y position on the plane. For example, point P' adjacent point P will receive a different level of exposure because of the different overlapping orientation of the irradiance profiles of the contributing fibers. The exposure modulation, which is generally undesirable, is defined as $[(E_{max} - E_{min})/(E_{max} + E_{min})] \times 100\%$, where $E_{max}$ and $E_{min}$ are, respectively, the maximum and minimum values of exposure as a function of Y position. The particular values of fiber parameters that minimize the exposure modulation are described below.

A useful equation derived by Rees-Lama in the referenced article to describe circular irradiance profile 22 is as follows:

$$k = aR = -R \sec\left(\sqrt{A}\, L/2\right) \tag{1}$$

where k is the radius of the irradiance profile, (a) is an "overlap parameter", R is the radius of the fiber, A is a gradient index constant and L is the fiber length (in the Z direction). Equation (1) can be rewritten as an equation for the overlap parameter (a):

$$a = -\sec\left(\sqrt{A}\, L/2\right) \quad (2)$$

Figure 3:
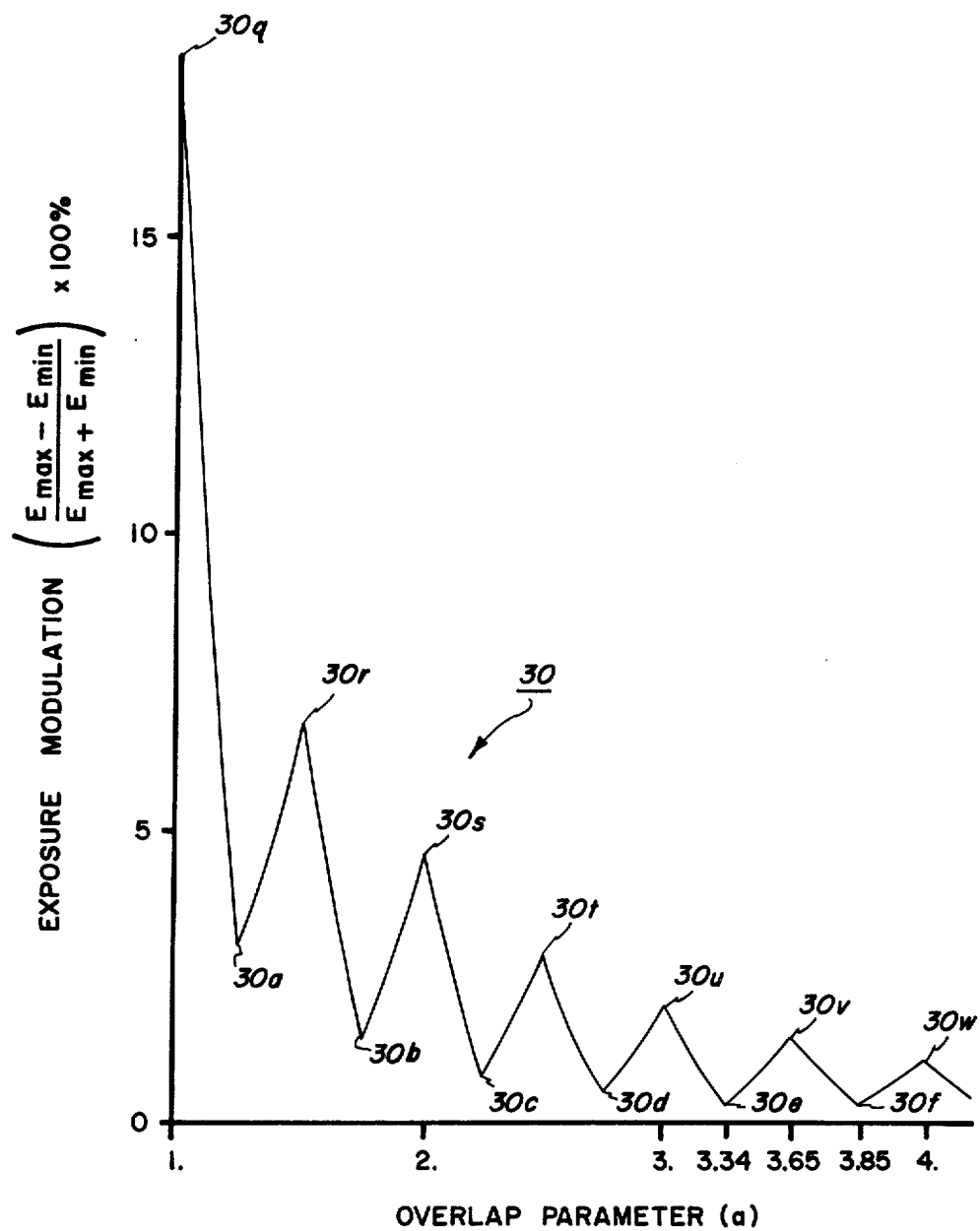
FIG. 3 is a graph plotting exposure modulation at the image plane against values of overlap parameter (a).

If (a) is made to change by substituting appropriate values of A and L, values of exposure modulation against (a) yield plot 30 shown in FIG. 3 for b=1.0. As is evident, the exposure modulation is not a monotonic decreasing function of (a) but, rather, has various maximum (30q–30w) and minimum (30a–30f) values. Thus, the modulation can be minimized by selecting values of (a) at one of points 30a–30f, which may be achieved by selecting particular values of the fiber parameters A, L.

As shown in the Rees-Lama article, the optimum values for (a) are also given by the equation $$a = \frac{b}{2}\sqrt{S(S+1)} \quad (3)$$

where (b) is a spacing factor equal to the separation between fiber centers divided by the fiber diameter (2R), and S=2, 3, 4, . . .

Note that Equation (3) may be rewritten as an equation for the spacing parameter $$b = \frac{2a}{\sqrt{S(S+1)}} \quad (4)$$

Figure 4:
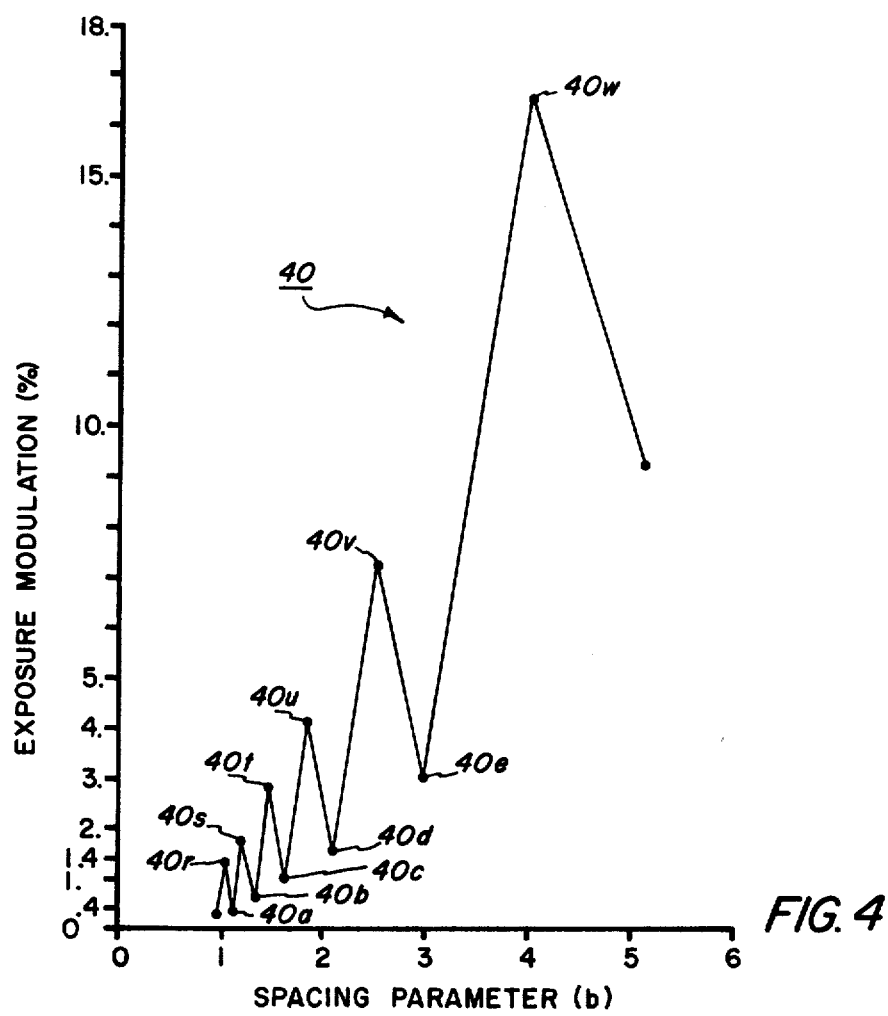
FIG. 4 is a graph plotting exposure modulation at the image plane against values of spacing factor b.

This equation would appear to be simply a restatement of Equation (3) without practical implication since, it would seem logical to assume that modulation should just increase as b is increased, i.e. as the fibers in the array are moved further and further apart. According to one aspect of the invention, however, Equation (4) yields optimum values of the spacing parameter (b) for which the exposure modulation is minimized. Applicant tested this assumption by selecting a prior art fiber array having the parameters $\sqrt{A}=0.1275$ mm$^{-1}$, and L=28.99 mm$^{-1}$. From equation (2) a value of (a) of 3.635 is derived. Fiber spacing parameters b for prior art arrays are typically around 1.03 and this value was selected for comparison. Values of exposure modulation were then calculated for a range of values of fiber spacing parameter b from 1.0 to 5.0 yielding plot 40 as shown in FIG. 4 for a=3.635. As the plot clearly demonstrates, instead of the intuitively expected monotonic increase in modulation with increasing distance between fibers (higher values of b), the exposure modulation has a number maximum (40r–40w) and minimum (40a–40f) values corresponding to particular values of b given by Equation (4). With this fresh insight, it was observed that the modulation could be minimized by selecting a value of b corresponding to one of the minimum points. Thus, if the fiber spacing for the example given were increased from the standard value of 1.03 to 1.12, modulation would be decreased from 1.4% to 0.4%.

The above principles are also relevant for selecting an optimum separation parameter b for minimum modulation in a single row array. For a single row array, the exposure modulation is increased relative to the two-row array, because of the elimination of the overlapping irradiance profiles from the second row. For the purpose of calculating exposure modulation, it may be seen with reference to FIG. 2 that a double row array with separation parameter b equal to 2 is equivalent to a single row array with a value of b equal to 1, which is the minimum value for an aligned single row array. Using the graph of FIG. 4, for the same fiber parameters, the optimum value of b (greater than 2) would be 2.10. This corresponds to a single row array with b equal to 1.05, and this value yields less exposure modulation than the close-packed single row array with b equal to 1.0. For other values of (a), i.e. other fiber parameters, the values of b yielding modulation minima are given, for a single row array, by Equation (4) divided by 2 or $$b = \frac{a}{\sqrt{S(S+1)}}, \quad S = 1, 2, \ldots \quad (5)$$

For example, if a =5.0, the optimum value of b given by Equation (5) for the single row array is 1.12, obtained when S=4.

The second problem to be addressed in constructing a practical single row array, as described above, is compensating for the reduction in average exposure. The average exposure $<E>$ on an image plane is given by the expression $$<E> = \frac{M\pi^2 N T n_o^2 A R^3}{3vb} \quad (6)$$

where M is the number of rows of fibers, T is fiber transmission, N is lambertian radiance of the object, $n_o$ is the refractive index on the fiber axis and v is the velocity of the image point moving through an exposure zone.

Figure 5:
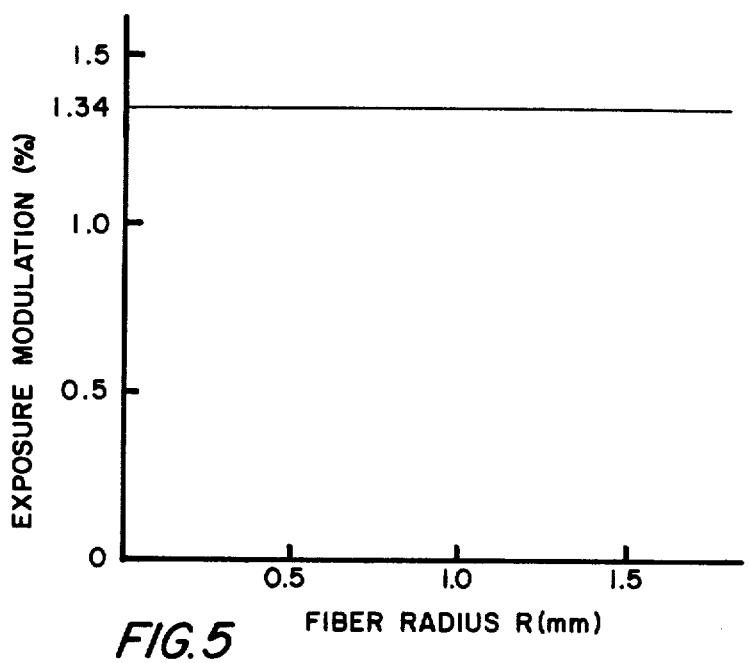
FIG. 5 is a graph plotting values of exposure modulation versus fiber radius.

For an imaging lens array with given fiber parameters and a specified illumination source, the average exposure for a one-row array, is reduced by a factor of 2 compared to the two-row array. From equation (6), the average exposure of a single row array may be increased by the lost factor of 2 or more by increasing A, R, or both. Since exposure depends on the cube of the fiber radius R while the distance between object and image planes is independent of radius (but dependent on A), a preferred solution would be to keep A fixed and increase R (an increase of R by 26% increases exposure by 100%). By increasing the radius however, it may be expected that the exposure modulation would worsen, since the fiber centers are moved further apart, and that the optimum single row separation parameter b of 1.05 as arrived at above for a=3.635 would no longer be valid. When this thesis was actually tested, however, it was determined that exposure modulation is *independent* of fiber radius as shown by FIG. 5.

The description thus far can be summarized as follows: For given gradient index fiber parameters ($n_o$, $\sqrt{A}$,L,R), the exposure modulation can be minimized for a unique, but not obivous, value of the fiber spacing parameter b. Furthermore, the exposure modulation is not dependent on the fiber radius R. The first observation provides the means of reducing exposure modulation in the known two-row prior art devices. But more importantly, the implications of both discoveries are utilized to assemble a single row array which is made as efficient as the two-row array but with minimum exposure modulation by increasing fiber radius R and by proper choice of the b parameter.

Figure 6:
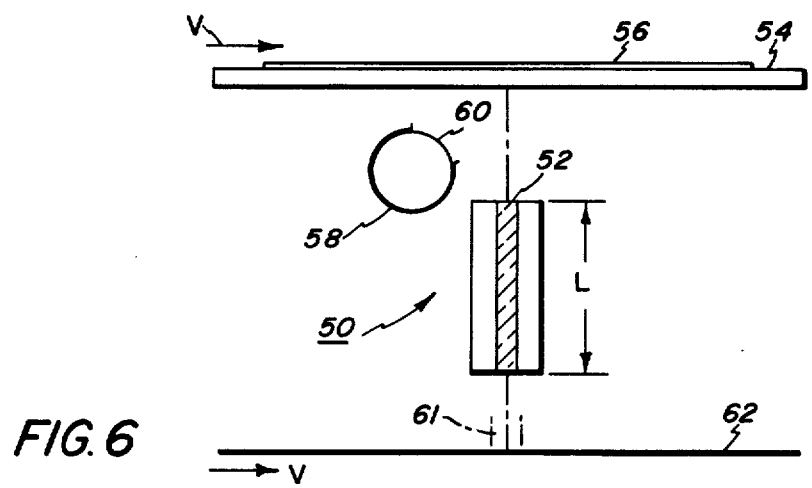
FIG. 6 is a schematic end view of a single row gradient index lens array imaging system.
Figure 7:
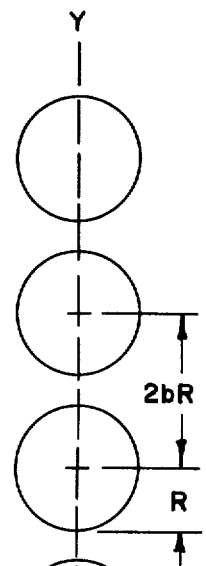
FIG. 7 shows spacing parameters for a single row lens array.

An exemplary single row gradient index lens array is shown in end view in FIG. 6 and in top view in FIG. 7. In FIG. 6, gradient index lens 50 comprises a single 220 mm long row 52 of 150 gradient index fibers. Transparent object plane 54 is adapted for movement past lens 50 in the indicated direction at a velocity v. Plane 54 has an object 56 which may be a document supported thereon. Fluorescent lamp 58 provides an intense narrow band of illumination through aperture 60 across the width of object plane 54. The exposure strip 61 on photosensitive plane 62 moves in the indicated direction at the same velocity v as the object plane. The object-to-lens distance is 32.3 mm; image-to-lens distance is 32.3 mm and length L of lens 50 is 35.4 mm for a total object-to-image distance of 100 mm. Fiber parameters were selected as follows:

$n_o = 1.53$
$\sqrt{A} = 0.100 \text{ mm}^{-1}$
$R = 0.65 \text{ mm}$

For these values, the overlap parameter a has the value of 5.05 and, from Equation (5), the desired value of b for minimum modulation was determined to be 1.13. The lens configuration described above provided the desired exposure level with 0.8% modulation.

Lens 50 was formed by pressing 150 fibers into a mold with epoxy. The pressing operation was controlled to achieve the desired spacing between fibers. The fibers could also be aligned with a template with grooves providing the desired b value.

Figure 8:
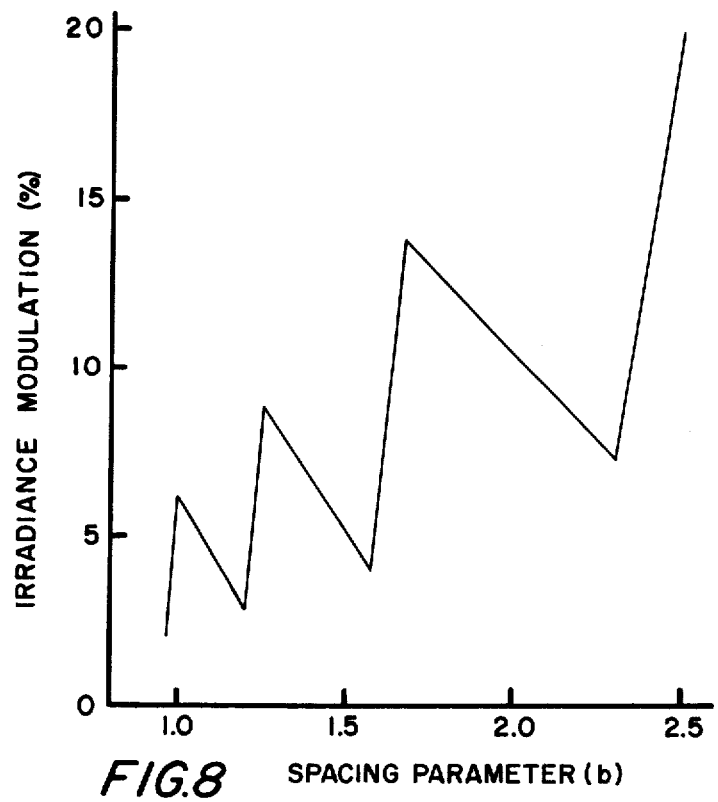
FIG. 8 is a graph plotting irradiance modulation at the image plane against values of spacing factor b.

In some applications (e.g. facsimile) the distribution of irradiance H in the image plane is of interest, rather than the distribution of exposure, E. In particular, the image plane irradiance along a line Y—Y' in FIG. 7 is desired to be uniform. The same principles applied above to the exposure distribution show that the irradiance modulation along the line Y—Y' is also minimized at certain preferred values of the spacing parameter b given for a single row array by the equation $$b = \frac{a}{S + .175} \quad (7)$$

where $b \geq 1$ and $S = 1, 2, 3 \ldots$ FIG. 8 is a plot of irradiance modulation, $(H_{max} - H_{min}/H_{max} + H_{min}) \times 100\%$, as a function of spacing parameter (b), for the case of overlap parameter (a) equal to 5.0. In this case, the optimum value of (b) is 1.20, which yields an irradiance modulation of 2.8%. Note that this value of (b) differs from the value $b = 1.12$ that minimized the exposure modulation for $a = 5$. Thus, in applications where the irradiance must be uniform, Equation (7) may be used to design a lens array with a preferred value of spacing parameter (b) to yield minimum irradiance modulation. Also, the fiber radii may be increased to obtain higher irradiance values without reducing the irradiance uniformity, similar to the previously described class of arrays designed for exposure application.

In conclusion, it may be seen that there has been disclosed an improved optical imaging system. The exemplary embodiment described herein is presently preferred, however, it is contemplated that further variations and modifications within the purview of those skilled in the art can be made herein. The following claims are intended to cover all such variations and modifications as fall within the spirit and scope of the invention.

What is claimed is:

1. An optical imaging system including a plurality of gradient index fibers combined into at least a single row to form a lens array, said array positioned between an object and image plane so as to transmit light reflected from an object onto said image plane thereby exposing at least a portion of said image plane, said array characterized by producing said exposure with a minimum amount of spatial modulation by optimum selection of a fiber spacing factor b defined by the term $$b = \frac{-\sec(\sqrt{A} \; L/2)}{\sqrt{S(S+1)}} \quad (M)$$

wherein
A = gradient index constant of the fiber
L = fiber length
M = 1,2 = number of rows of fibers
S = 1, 2, 3 . . .

2. An optical imaging system including a plurality of gradient index fibers combined into at least a single row to form a lens array, said array positioned between an object and image plane so as to transmit light reflected from an object onto said image plane thereby irradiating at least a part of said image plane, said array characterized by producing a relatively uniform level of irradiance on said image plane by selection of an optimum fiber spacing factor b defined for a single row array by the term $$b = \frac{-\sec\left(\sqrt{A} \; L/2\right)}{S + .175}$$

where
A = gradient index constant of the fiber
L = fiber length
S = 1, 2, 3 . . .

* * * * *